No. 783,679. PATENTED FEB. 28, 1905.
C. CAILLE.
SPEED INDICATOR FOR AUTOMOBILES, &c.
APPLICATION FILED NOV. 28, 1904.
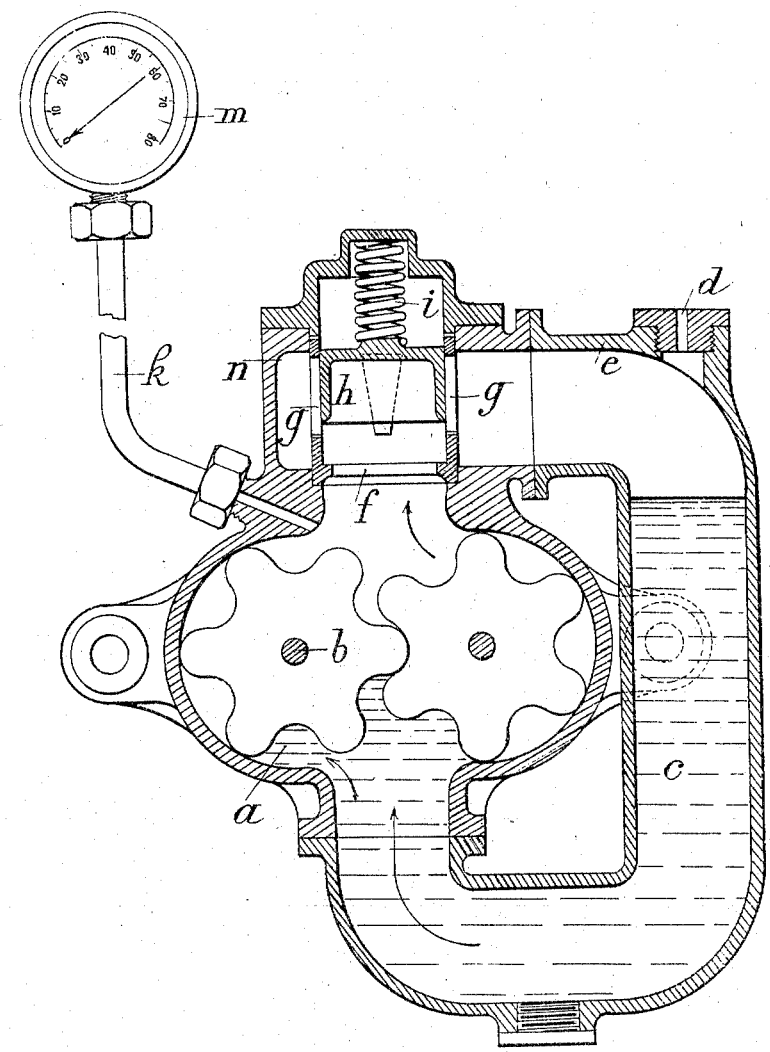

No. 783,679. Patented February 28, 1905.

UNITED STATES PATENT OFFICE.

CHARLES CAILLE, OF LE PERREUX, FRANCE.

SPEED-INDICATOR FOR AUTOMOBILES, &c.

SPECIFICATION forming part of Letters Patent No. 783,679, dated February 28, 1905.

Application filed November 28, 1904. Serial No. 234,618.

*To all whom it may concern:*

Be it known that I, CHARLES CAILLE, a citizen of the Republic of France, residing at 7 Rue des Vignes, Le Perreux, Seine, France, have invented new and useful Improvements in Speed-Indicators for Use with Automobiles and for other Purposes, of which the following is a specification.

This invention relates to a speed-indicator for use with automobiles and for other purposes.

This apparatus comprises, essentially, a pump for drawing in and delivering liquid operated from the wheels of the vehicle. Its delivery-pipe is connected to a pressure-indicator that is suitably graduated to indicate speeds. This indicator is connected to the delivery-pipe at a point situated between the displacing parts of the pump and the orifice or orifices discharging into the atmosphere. These orifices are formed in a discharge-chamber, in which works a valve, such as a piston slide-valve or rotary flap-valve, subjected on one face to the pressure of the liquid delivered by the pump and on the other face to an opposing pressure or spring action. The said valve uncovers a greater or less area of the discharge orifice or orifices in such a manner that the pressure which is transmitted to the indicator will vary in accordance with the sectional area that is uncovered and the velocity of discharge of the liquid which varies in accordance with the counter-pressure exerted upon the outside face of the aforesaid valve. By suitably determining the three factors—namely, the dimensions and shapes of the orifices, the opposing pressure, and the area exposed to the pressure of the liquid delivered by the pump—the indicator will be enabled to give indications that will be practically proportional to the speed of rotation of the pump, and consequently to the speed of progression of the vehicle.

A practical construction of the improved indicator is illustrated by way of example in the accompanying drawing in sectional elevation. In this example the pump is shown as a rotary pump of the cased type, one of the shafts $b$ of which is driven from the wheels of the vehicle by means of a suitable gear. The liquid is contained in a reservoir $c$, that communicates with the atmosphere through an orifice $d$ and is connected by a bend $e$ to the special delivery-chamber $f$. In the walls of this chamber, which is shown as being cylindrical, but which may have any other suitable shape, are orifices $g$. In this chamber there works a piston slide-valve $h$, which is exposed on its lower face to the pressure of the liquid delivered by the pump and on its upper face to the counter-pressure of a spring $i$. The delivery-pipe is connected below the orifices $g$ by a pipe $k$ to an indicator $m$, that has been graduated "by comparison." The ports $g$ of the chamber $f$ open into a casing $n$, connected by the bend $e$ to the reservoir $c$, so that the liquid discharged through the ports $g$ will be returned directly to the said reservoir. Instead of the rotary pump, as shown, any other known type of rotary or reciprocating pump of the cased type may be employed. Further, the constructional details, such as the shape and nature of the piston slide-valve $h$ (or rotary flap-valve) or of the opposing part $i$, may be varied without altering the nature of this invention.

What I claim is—

1. In apparatus for indicating the speed of a moving part the combination of a liquid suction and delivery pump, a chamber into which said pump delivers, having exit-ports in its sides, a valve controlling said exit-ports, and exposed on one side to the pressure of the pump-delivery, means for exerting an opposing pressure on its other side, a pressure-indicator communicating with the delivery-chamber of the pump at a point between the liquid-displacing element of the pump and the inlet side of the aforesaid exit-ports, said pump being driven by the moving part, substantially as described.

2. In apparatus for indicating the speed of a moving part, the combination of a liquid suction and delivery pump, a chamber into which said pump delivers, exit-ports formed in said chamber, a valve controlling said exit-ports and exposed on its side nearest the said ports to the pressure of the pump-delivery, a spring exerting pressure on the opposed side of said valve, a duct connecting the suction-chamber of the pump with the outlet side of said exit-ports, a pressure-indicator communicating with the delivery-chamber of the pump at a point between the liquid-displacing element of the pump and the inlet side of the aforesaid exit-ports, said pump being driven by the moving part, substantially as described.

3. In apparatus for indicating the speed of a moving part, the combination of a rotary liquid suction and delivery pump, a chamber into which said pump delivers, exit-ports formed in said chamber, a piston slide-valve controlling said exit-ports and exposed on its side nearest the said exit-ports to the pressure of the pump-delivery, a spring exerting pressure on the opposed side of said piston slide-valve, a duct connecting the suction-chamber of the pump with the outlet side of said exit-ports, a pressure-indicator communicating with the delivery-chamber of the pump at a point between the rotary liquid-displacing element of the pump and the inlet side of said exit-ports, the rotary liquid-displacing element of the pump being operated by the said moving part, substantially as described.

In testimony whereof I have signed my name to this specification in the presence of two subscribing witnesses.

CHARLES CAILLE.

Witnesses:
 LOUIS GARDET,
 JOHN BAKER.